United States Patent Office 2,819,436
Patented Jan. 7, 1958

2,819,436
METHOD OF MAKING DRY CONTACT RECTIFIERS, PARTICULARLY SELENIUM RECTIFIERS

Heinrich A. Bartels, Nurnberg, Germany, assignor to International Standard Electric Corporation, New York, N. Y., a corporation of Delaware No Drawing. Application June 24, 1953
Serial No. 363,941

Claims priority, application Germany June 27, 1952

4 Claims. (Cl. 317—241)

This invention relates to a process for manufacturing dry cell rectifiers particularly one suitable for mass production, and for forming very thin foil-like rectifier elements.

Selenium rectifiers are usually made by applying a selenium layer to a base electrode and covering the selenium layer with a cover or counter electrode. To improve the adhesion of the selenium to the base electrode and also to improve the electrical contact therewith, it has been customary to apply a nickel coating to the base electrode. In order to obtain a foil-like rectifier it has been also suggested that the nickel layer, together with the structure of layers above it, should be detached from the carrier electrode of aluminum by forming an oxide coating on the aluminum.

Various methods have been described for improving the conductivity of the selenium, for improving the blocking layer, and for preventing aging of the rectifier. One suggestion is that the blocking layer may also be made by varnishing the selenium with a thin coat of lacquer, a step which has proven successful. A solution of polystyrene (Polystyrol) in benzene ("Benzol") has been used for this purpose. Solutions have been already used which cause a dissolving at the selenium surface besides the formation of the artificial blocking layer for receiving a smooth wetting of the selenium surface and thus an equal thickness lacquer blocking layer. Details about this are given in the German Patent 812,570, in which chinoline and pyridine are named. These materials cause a superficial solution of the selenium on the one side, while they are resin-forming on the other side which may be utilized for the production of the blocking layer.

It is also known that lacquers may be made which are conductive. Suspensions of metallic particles in lacquer and other similar suspensions of metallic particles have been used for the making of electrical contacts.

In accordance with the main feature of the present invention, the process of manufacturing dry-cell rectifiers is basically simplified by utilizing conductive lacquers for the production of the rectifier electrodes. Furthermore following the above general idea of making the base and/or counter electrode out of a substance that has been made conductive, preferably a lacquer. In accordance with a further feature of the present invention the artificial blocking layer on the selenium is made simultaneously with the making of the counter electrode out of the conductive lacquer.

For the production of the base electrode a suspension medium is used which not only withstands the formation temperature of the selenium but will harden during the formation process. Suitable suspension mediums for this purpose would be the synthetic resin lacquers, which harden under heat treatment, such as for example phenol resin varnishes which have been produced from thermosetting synthetic resins. For instance resol may be dissolved in industrial alcohol eventually with additions of other dissolving materials e. g. ether, and the thus received phenol resin varnish given into an oven to be hardened at a temperature of approximately 100–150° C. or higher. A very hard phenol resin film will be received giving the rectifier element the necessary stability. Cold hardening varnishes may be also used and eventually those pre-hardening in the cold and being finally hardened by a heat treatment. Suitable varnishes are e. g. such known by the commercial names Diphen W and Luphen H. This final hardening eventually may be performed at the same time as the formation of the rectifiers.

With respect to the basic conductive lacquer substance to be used in making the various electrodes, it is preferred to use as the suspensoid very fine particles of those metals or substances which have heretofore been found satisfactory in the construction of rectifiers. Such materials would include iron powder or nickel powder or particles of alloys thereof, containing other components amongst which bismuth is particularly desirable. The quantity of suspended particles or powder per unit volume is preferably large so that the optimum contact between discrete particles of metal is obtained upon application of the conductive lacquer, besides providing a conductive surface for making contact with the selenium. The production of the metallic powder will be explained because many methods are well known e. g. in the technique of the production of metallic lacquers. The powder may be attained e. g. by reduction of the oxides. In that case alloys of compounds known and considered satisfactory in the rectifier construction are used; the desired raw powder may also be attained by grinding of the finished alloy.

With respect to the counter electrode, there is a wider choice in the basic lacquer substance due to the fact that the selenium layer has already been formed, unless of course it is intended to perform additional heat treatments of the rectifier after application of the counter electrode. The counter electrode for example may consist of polystyrene dissolved in benzene or of a nitro-cellulose lacquer preferably with an addition of camphor, particles of tin and/or cadmium or particles of an alloy of both metals with eventual additions of other substances such as for example thallium. Preferably the particles will have corners or edges in order to produce a sort of multi-point rectifier. Particles of this kind may be produced by grinding as mentioned before. Needle-shaped particles are produceable by filing. Finally it is also possible to use small crystals. In this case also the characteristics of the rectifier depend on the properties of the conductive lacquer.

By appropriate selection of the quantity of the suspended particles and/or the method of application of the lacquer, the thickness of the lacquer blocking layer, which is to be created coincidentally with the production of the counter electrode is determined. The thickness of the blocking layer may be determined by permitting the metal particles to settle as a result of gravity, to the lower portion of the lacquer.

In accordance with the present invention the base electrode of lacquer may be made by applying the lacquer to a solid carrier plate, for example by brushing or spraying. After the rectifier has been completely built-up the base electrode and therefore, all the electrodes attached thereto are detached from the carrier plate. Alternatively the base electrode may be produced by spraying the lacquer on a glass plate as a carrier. This procedure enables the manufacture of foil-like rectifier elements. This procedure may be developed into a mold procedure or pouring procedure similar to that used for the production of photographic films.

In accordance with a further feature of the present invention, the conductive lacquer for the counter electrode may be such that as to react with certain additions contained in the selenium to produce an effective blocking layer. Well-known additions are for example halogens. Suitable dissolving materials for this are e. g. dialkyl compounds, preferably oxylic ether and thio ether. Details about this are given in the German Patent 829,018.

The conductive lacquer may be exposed to any electrical magnetic or mechanical fields to attain for example a determined alignment and/or intimate electrical connection among the particles where needle shaped metallic particles are employed. This orientation is preferably applied after the lacquer has been applied to the selenium layer. In case that an alignment of the metallic particles by a magnetic field is not possible, it may be attained by spraying on the metallic lacquer. It is known that during spraying the particles align themselves in the spraying direction. By adjustment of the rectifier plate to the spraying direction a preferable position of the particles may be attained. Another possibility is to align the lacquer layer in a certain direction as employed e. g. at the production of polarization filters.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In the process of making a rectifier, in which a barrier layer is formed on a semi-conductive layer and a counter electrode is applied thereover, the steps comprising applying a non-conductive lacquer, having distributed metal material therein rendering it conductive, to said semi-conductive layer to form the counter electrode, and removing the conductive material from a portion of the lacquer adjacent the semi-conductive material to form the said barrier layer.

2. In the process of making a rectifier, in which a barrier layer is formed on a semi-conductive layer and a counter electrode is applied thereover, the steps comprising applying a non-conductive lacquer, having distributed metal material therein rendering it conductive, to said semi-conductive layer to form the counter electrode, and removing by gravity the conductive material from a portion of the lacquer adjacent the semi-conductive material to form the said barrier layer.

3. A process according to claim 1, wherein said semi-conductive layer is selenium, further comprising the preliminary step of forming a base electrode by treating a conductive metal lacquer to render it hard, and applying a semi-conductive layer to said hardened conductive lacquer.

4. A rectifier comprising a base electrode, a semi-conductive layer, a counter electrode on said semi-conductive layer, said counter electrode comprising a non-conductive lacquer having distributed small metal particles therein rendering it conductive and a barrier layer of said non-conductive lacquer, said particles constituting a multi-point rectifier through the barrier layer formed by the non-conductive lacquer.

References Cited in the file of this patent

UNITED STATES PATENTS 2,452,603    Saslaw                 Nov. 2, 1948

FOREIGN PATENTS 562,862    Great Britain           July 19, 1944